(12) United States Patent
Slark et al.

(10) Patent No.: US 8,277,601 B2
(45) Date of Patent: Oct. 2, 2012

(54) REACTIVE HOT MELT ADHESIVE

(75) Inventors: Andrew Slark, Wokingham (GB); Malcolm Graham, Uplyme (GB)

(73) Assignee: Henkel Corporation, Rocky Hill, CT (US)

( * ) Notice: Subject to any disclaimer, the term of this patent is extended or adjusted under 35 U.S.C. 154(b) by 184 days.

(21) Appl. No.: 12/333,795

(22) Filed: Dec. 12, 2008

(65) Prior Publication Data

US 2010/0152394 A1 Jun. 17, 2010

(51) Int. Cl.
*C09J 4/00* (2006.01)

(52) U.S. Cl. ............... 156/331.4; 156/331.1; 156/331.5; 525/452; 525/453; 525/454; 525/457; 525/460; 548/215

(58) Field of Classification Search ................... 525/452, 525/453, 454, 460, 457; 548/215; 156/331.4, 156/331.1, 331.5
See application file for complete search history.

(56) References Cited

U.S. PATENT DOCUMENTS

| 3,743,626 | A | | 7/1973 | Emmons | |
|---|---|---|---|---|---|
| 4,176,212 | A | * | 11/1979 | Brack | 428/423.1 |
| 4,381,388 | A | | 4/1983 | Naples | |
| 4,471,102 | A | | 9/1984 | Petschke | |
| 4,879,365 | A | * | 11/1989 | Petschke et al. | 528/49 |
| 6,545,117 | B1 | * | 4/2003 | Moos et al. | 528/49 |
| 7,135,128 | B2 | * | 11/2006 | Hippold et al. | 252/182.22 |

FOREIGN PATENT DOCUMENTS

WO 9213907 8/1992

OTHER PUBLICATIONS

Meier-Westhues, U.; Polyurethanes: Coatings, Adhesives, and Sealants, 2007, p. 25-35.*
Dow Voranol 2070 Product Data Sheet, p. 1-2, Mar. 2001.*

* cited by examiner

*Primary Examiner* — David W Wu
*Assistant Examiner* — Robert Jones, Jr.
(74) *Attorney, Agent, or Firm* — Steven C. Bauman; James E. Piotrowski

(57) ABSTRACT

Solvent free, moisture curable reactive hot melt adhesives are prepared using an oxazolidine functional prepolymer and a polyfunctional isocyanate.

19 Claims, No Drawings

REACTIVE HOT MELT ADHESIVE

FIELD OF THE INVENTION

The invention relates to solvent-free hot melt adhesives, in particular polyurethane based reactive hot melt adhesives prepared using an oxazolidine functional prepolymer and a polyfunctional isocyanate.

BACKGROUND OF THE INVENTION

Hot melt adhesives are solid at room temperature but, upon application of heat, melt to a liquid or fluid state in which form they are applied to a substrate. On cooling, the adhesive regains its solid form. The hard phase(s) formed upon cooling the adhesive imparts all of the cohesion (strength, toughness, creep and heat resistance) to the final adhesive. Curable hot melt adhesives, which are also applied in molten form, cool to solidify and subsequently cure by a chemical crosslinking reaction. An advantage of hot melt curable adhesives over traditional liquid curing adhesives is their ability to provide "green strength" upon cooling prior to cure.

The majority of reactive hot melts are moisture-curing urethane adhesives. These adhesives consist primarily of isocyanate terminated polyurethane prepolymers that react with surface or ambient moisture in order to chain-extend, forming a new polyurethane polymer. Polyurethane prepolymers are conventionally obtained by reacting diols with diisocyanates. Pure diols are favored for use, instead of polyols with higher functionality, to avoid excessive branching that can lead to poor pot stability. Methylene bisphenyl diisocyanate (MDI) is favored over lower molecular weight isocyanates to minimize volatility and provide good mechanical properties. Cure is obtained through the diffusion of moisture from the atmosphere or the substrates into the adhesive, and subsequent reaction. The reaction of moisture with residual isocyanate forms carbamic acid. This acid is unstable, decomposing into an amine and carbon dioxide. The amine reacts rapidly with isocyanate to form a urea. The final adhesive product is a crosslinked material held together primarily through urea groups and urethane groups.

Standard polyurethane reactive hot melt adhesives based on MDI typically contain 2-5% of MDI monomer and, as noted above, the curing process creates carbon dioxide. At typical application temperatures for reactive hot melts, the free MDI monomer is volatile and can produce safety hazards. The carbon dioxide released can cause problems in bubble formation when bonding non-porous substrates such as plastics. This can reduce bond strength and cause aesthetic problems. Also, when bonding plastic components and after aging in hot moist environments standard reactive hot melts tend to fail adhesively and not cohesively.

There remains a need for improvements in reactive hot melt technology to expand the application of such adhesives and their effectiveness in such applications. The present invention addresses this need.

SUMMARY OF THE INVENTION

The invention provides solvent free, moisture curable polyurethane-based reactive hot melt adhesive compositions. The adhesives of the invention comprise an oxazolidine functional prepolymer and a polyfunctional isocyanate. The functional oxazolidine prepolymer and/or the polyfunctional isocyanate include conventional primary or secondary, aromatic or aliphatic isocyanates.

Polyurethane adhesives prepared in accordance with the invention have low volatile monomer content, are thermally stable at the application temperature and provide good mechanical properties after cure, including durability to temperature and moisture.

One aspect of the invention is directed to a polyurethane hot melt adhesive composition having low volatile monomer content.

In one embodiment, the polyurethane hot melt adhesive is prepared using an oxazolidine functional prepolymer and a polyfunctional isocyanate. The oxazolidine functional prepolymers may be prepared by reacting a polyurethane prepolymer based on aromatic isocyanates, e.g., MDI, by reaction of the —NCO terminated prepolymers with a functional oxazolidine, such as a hydroxy functional oxazolidine. A polyisocyanate is then added. The adhesive may optionally also comprise a thermoplastic polymer or resin.

Another embodiment of the invention is directed to a method of preparing a moisture curable polyurethane hot melt adhesive. In the practice of the invention, excess polyisocyanate is reacted with polyol to form —NCO functional prepolymers. The remaining —NCO is reacted with hydroxy functional oxazolidine. Preferably greater than 75% of the —NCO in the —NCO functional prepolymer is reacted with the hydroxyl functional oxazolidine, more preferably greater than 90%, more preferably greater than 95% and even more preferably 100%. This is followed by addition of polyisocyanate.

Yet another embodiment of the invention is directed to a method for bonding materials together which comprises applying the reactive hot melt adhesive composition of the invention in a molten form to a first substrate, bringing a second substrate in contact with the composition applied to the first substrate, and subjecting the applied composition to conditions comprising moisture, whereby the composition cools and cures to an irreversible solid form.

Still further the invention provides articles manufactured using the adhesive of the invention. Adhesive formulations may be prepared that are particularly well suited for end use applications such as panel lamination and the bonding of plastics such as polycarbonate.

DETAILED DESCRIPTION OF THE INVENTION

All percents are percent by weight of the adhesive composition, unless otherwise stated.

The use of oxazolidines in polyurethane compositions is known, but most of the literature refers to solvent based systems which are applied at low temperatures. The prior art claims that conventional aromatic and aliphatic isocyanates are unsuitable in combination with oxazolidines for moisture curing hot melts due to thermal instability from catalysis of trimerisation reactions by tertiary amines present in the oxazolidines. Suitable thermally stable moisture curable hot melt compositions are only provided by compositions comprising an isocyanate terminated prepolymer based on a sterically hindered isocyanate and an oxazolidine compound. However, sterically hindered isocyanates such as meta-tetramethylxylylene diisocyanate (TMXDI) have limited availability and are very expensive.

It has now been discovered that moisture curable polyurethane adhesives having low residual monomer can be prepared and used to bond substrates together. The adhesive of the invention comprises an oxazolidine functional prepolymer and a polyfunctional isocyanate.

The moisture curable, hot melt polyurethane adhesives of the invention may be prepared through the reaction of a mixture of polyols, e.g., polyether, polyester, acrylic polyol, with an excess of a diisocyanate-containing compound at a typical temperature from about 100° C. to 130° C. to form —NCO functional prepolymers. In one preferred embodiment, a non reactive EVA is blended with the polyol mixture before reaction with the isocyanate. An oxazolidine functional prepolymer is then made by the reacting the —NCO end groups of the isocyanate terminated polyurethane prepolymer with a functional oxazolidine. A polyfunctional isocyanate, such as isophorone diisocyanate (IPDI) trimer is then added.

In the presence of moisture, the oxazolidine rings in the oxazolidine functional prepolymer open to form —NH— and —OH. The —NH— reacts with the aliphatic —NCO groups in the IPDI trimer to form a crosslinked network. Carbon dioxide is not formed. If used, the EVA is present as a dispersed phase with a typical particle size of 5-40 microns, acting to toughen the adhesive after cure and promote cohesive failure on plastic substrates. The IPDI trimer, although a monomer, has a high molecular weight compared to MDI (729 v 250 g per mole) and has a very low vapor pressure at application temperatures (Melting point of IPDI trimer is 115° C. v 32° C. for MDI).

Alternatively, the oxazolidine functional prepolymer may be made in the same way as above, but then a low molecular weight MDI functional prepolymer is added as the polyfunctional isocyanate. A typical, suitable prepolymer is Desmodur VPLS 2397. This is made by reacting a polyether polyol with an excess of MDI but then removing most of the excess monomer that remains so that the unreacted MDI concentration is 0.2%. Desmodur VP LS 2397 has a high molecular weight compared to MDI (1400 v 250 g per mole) and has a very low vapour pressure. In the presence of moisture, the oxazolidine rings in the prepolymer open to form —NH— and —OH. Both the —NH— and —OH react with the aromatic —NCO groups in the prepolymer to form a crosslinked network.

For purpose of clarity the following terms are to be understood as follows:

A "functional oxazolidine" is used herein to refer to an oxazolidine compound that contains a functional group capably of reacting with an isocyanate prepolymer. A non-limiting example of a functional oxazolidine is a hydroxy functional oxazolidine. Hydroxy functional oxazolidines may be prepared reacting a β-aminoalcohol such as diethanolamine and an aldehyde.

An "oxazolidine functional prepolymer" is used herein to mean a prepolymer that contains oxazolidine functional groups. Oxazolidine functional prepolymers may be prepared by reacting a functional oxazolidine, e.g., hydroxy functional oxaxolidine, with an isocyanate terminated prepolymer.

"Isocyanate terminated prepolymer," "isocyanate terminated polyurethane prepolymer," "polyurethane prepolymer," "isocyanate functional prepolymer," and "isocyanate prepolymer" are used interchangeably herein and refer a product prepared by reacting an isocyanate (a diisocyanate (i.e., a diisocyanate containing compound) or polyisocyante (a polyisocyante containing compound) with polyols.

A "polyisocyanate" refers to a material that contains 2 or 3 or more isocyanate (—N═C═O) functional groups, but which contains a low concentration of volatile diisocyanate with molecular weight below 300 g per mole, i.e., <1%, preferably <0.5%, more preferably <0.25% and more preferably <0.1%. This includes polyfunctional monomers and isocyanate terminated prepolymers.

The reactive hot melt compositions of the invention are useful for bonding articles composed of a wide variety of substrates (materials), including but not limited to various types of wood, metal, polymers, glass and fabrics or textiles. As such, these adhesives find particular use in applications such as the manufacture of doors including entry doors, garage doors and the like, furniture, flooring, the manufacture of architectural panels, interior and exterior automotive applications such as headlamp bonding and interior trim. Other non-limiting uses include textile bonding applications (carpet and clothing), use in the manufacture of footwear (shoes), and use as a glazing/backbedding compound in the manufacture of windows. They are particularly well suited for use in panel laminations for both interior and exterior use, and for bonding plastic.

The urethane prepolymers that can be used to prepare the adhesives of the invention are those conventionally used in the production of polyurethane hot melt adhesive compositions. Any suitable compound, which contains two or more isocyanate groups, may be used for preparing the urethane prepolymers. Typically from about 2 to about 25 parts by weight of an isocyanate is used, although this is not limiting.

Organic polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, 2,4-toluene diisocyanate, cyclopentylene-1,3-diisocyanate, cyclo-hexylene-1,4-diisocyanate, cyclohexylene-1,2-diisocyanate, 2,6-toluene diisocyanate, 4,4'-diphenylmethane diisocyanate, 2,4'-diphenylmethane diisocyanate, 2,2-diphenylpropane-4,4'-diisocyanate, xylylene diisocyanate, tetramethyl xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanatobenzene, 2,4,6-triisocyanato-toluene, 4,4'-dimethyldiphenylmethane-2,2',5,5-tetratetraisocyanate, and the like. While such compounds are commercially available, methods for synthesizing such compounds are well known in the art. Preferred isocyanate-containing compounds are methylenebisphenyidiisocyanate (MDI), isophoronediisocyanate (IPDI), hydrogenated methylenebisphenyldiisocyanate (HMDI) and toluene diisocyanate (TDI).

Most commonly, the prepolymer is prepared by the polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, as well as mixtures thereof. The polyol is typically used in an amount of between about 5 to about 70 parts by weight.

Examples of polyether polyols include a linear and/or branched polyether having plural numbers of ether bondings and at least two hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide.

A number of suitable polyether polyols are commercially available. Non-limiting examples include Voranol P400, P725, P1000, P2000, P4000 (Dow), PolyG 20-56 (Arch) and Pluracol P-2010 (BASF), Acclaim 4200 (Bayer).

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol monoethyl ether, diethylene glycol, 2-ethylhexanediol-1,4, cyclohexanediol-1,4,1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, suberic acid, azelaic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms. Dimer fatty acids can also be used—these are well known in the art and refers to the dimerisation product of mono- or polyunsaturated acids and/or esters thereof. Preferred dimer fatty acids are dimers of $C_{10}$- to a $C_{30}$, more preferably $C_{12}$- to a $C_{24}$, particularly $C_{14}$- to a $C_{22}$ and especially $C_{18}$ alkyl chains. Suitable dimer fatty acids include the dimerisation products of oleic acid, linoleic acid, linolenic acid, palmitoleic acid and elaidic acid. The dimerisation products of the unsaturated fatty acid mixtures obtained in the hydrolysis of natural fats and oils, e.g., sunflower oil, soybean oil, olive oil, rapeseed oil, cottonseed oil and tall oil may also be used. In addition to the dimer fatty acids, dimerisation usually results in varying amounts of oligomeric fatty acids (so called "trimer") and residues of monomeric fatty acids (so-called "monomer"), or esters thereof, being present. Suitable dimer fatty acids have a dimer acid content greater than 60%, preferably greater than 75%, more preferably in the range 90 to 99.5%, particularly 95 to 99%, and especially 97 to 99%.

Commercially available polyesters which may be used in the practice of the invention include crystalline and amorphous materials such as Dynacoll 7360, 7380, 7330, 7231, 7250 (Evonik), Rucoflex S-105-10 (Bayer), Stepanpol PN110 (Stepan), Priplast 3196 (Uniqema).

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above.

Further, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyldiethanolamine and the like.

In a preferred embodiment of the invention, the composition contains an acrylic polymer. The poly(meth)acrylate segments may be linear or branched with a wide range of Tg values, between about −48° C. and 105° C., more preferably about −20° C. to 85° C. and more preferably 15° C. to 85° C. The polymer comprises copolymerized alkyl (meth)acrylic monomers. Suitable comonomers include the $C_1$ to $C_{12}$ esters of methacrylic and acrylic acids including, but not limited to methyl methacrylate, ethyl methacrylate, n-propyl, iso-propyl methacrylate, n-butyl methacrylate, isobutyl methacrylate, n-hexyl methacrylate, n-octyl methacrylate 2-ethylhexyl methacrylate, dodecyl (lauryl) methacrylate, cyclohexylmethacrylate, norbornyl methacrylate or the corresponding acrylates. Mixtures of compatible (meth)acrylate monomers may also be used. Methacrylic and acrylic comonomers based on esters of methacrylic and acrylic acid with poly(ethylene glycol) and/or poly(propylene glycol and/or glycol ethers may also be used.

Functional comonomers may also be used in the poly (meth)acrylate, e.g., acid, amine, hydroxyl or epoxy functionalised (meth)acrylic comonomers although this list is not exclusive. Hydroxyl containing acrylic polymers are preferred. In accordance with one embodiment of the invention, the hydroxyl containing acrylic polymer may function as the polyol component, in which case, no additional polyol need to be added to the reaction. In a preferred embodiment of the invention, the hydroxyl containing acrylic polymer is used as part of the polyol component in conjunction with polyether polyol and, optionally, polyester polyol. Suitable hydroxyl functionalised comonomers that can be incorporated into the acrylic polymer include, but are not limited to, 2-hydroxyethylmethacrylate, 2-hydroxyl propyl methacrylate and 2-hydroxybutyl methacrylate or the corresponding acrylates. Suitable acid functional comonomers that can be incorporated into the acrylic polymer include, but are not limited to, methacrylic acid and acrylic acid. Suitable amine-functionalised comonomers include, but are not limited to, dimethylaminoethyl methacrylate, diethylaminoethyl methacrylate or the corresponding acrylates.

Virtually any ethylenically unsaturated monomer may be utilized as a comonomer in the acrylic polymers. Other additional vinyl comonomers that may be used include the vinyl esters (e.g., vinyl acetate and vinyl propionate); vinyl ethers; esters of crotonic acid, maleic acid, fumaric acid and itaconic acid; styrene; alkyl styrenes; acrylonitrile; butadiene; etc., as well as comonomers thereof.

The poly(meth)acrylate is made by free-radical polymerisation techniques well-known in the art using azo or peroxide initiator in solvent, bulk, suspension or emulsion polymerisation. Suspension polymerisation is useful as it is a facile way of providing polymer in bead form for subsequent formulation into the hot melt coating composition.

In a preferred embodiment, the composition also contains a non reactive polymer. This can be, e.g., an acrylic polymer of methyl and butyl methacrylate which does not contain a functional monomer (which can react with an isocyanate). More preferably, the non reactive polymer is ethylene-vinyl acetate (EVA). The preferred concentration is below 30%, more preferably 5-20% and especially 5-15%.

Following reaction to form the isocyanate functional prepolymer, a functional oxazolidine is added to form an oxazolidine functional prepolymer. A wide variety of functional oxazolidines can be used in the manufacture of the invention. Monofunctional oxazolidines are preferred and have the general structure

where X is a functional group capable of reacting with an isocyanate prepolymer, Z is an organic spacer group and Y is an oxazolidine group. Mono hydroxyl functional oxazolidines are preferred, with one class of preferred oxazolidine compounds being prepared by the reaction of a β-aminoalcohol and an aldehyde. Reaction products of diethanolamine are particularly preferred, as shown below.

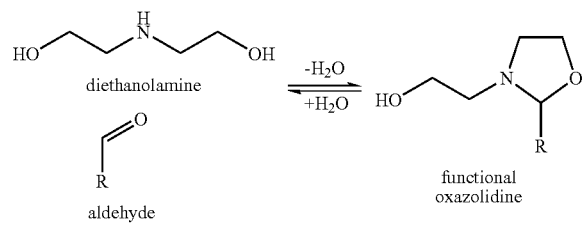

R in the aldehyde can be an aromatic or substituted aromatic group, a cycloaliphatic or substituted cycloaliphatic group. Examples include benzaldehyde, p-methyl benzaldehyde, 4-methoxy benzaldehyde, cyclohexanal. Alternatively, R is a linear or branched chain where

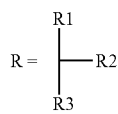

R1, R2 and R3 can be H or methyl, e.g., if R1=H and R2=R3=methyl, this is isobutyraldehyde. However, higher molecular weight aldehydes can be used without compromising performance. In these cases, R1=H, R2=methyl or ethyl and R3=a linear or branched chain containing 2-20 atoms. Examples include 2-ethyl hexanal or lily aldehyde. These have the added advantage that the odor of the aldehyde released during cure is more pleasant. Even with these higher molecular weight aldehydes, thermal stability is good, the moisture cure rate is acceptable and the mechanical properties produced are good and durable to temperature and moisture.

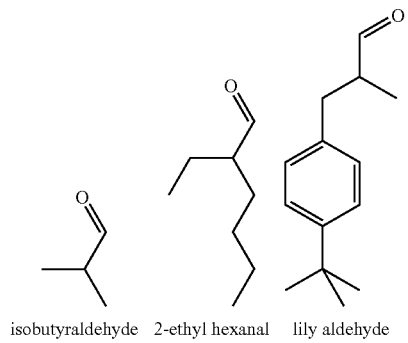

isobutyraldehyde   2-ethyl hexanal   lily aldehyde

Optionally, R3 can contain heteroatoms such as O, S and N. A non-limiting example of such aldehydes that can be used include anisyl propanal. Alternatively, aldehydes can be used where R1, R2 are at least methyl groups and R3 is a linear or branched chain containing 2-20 atoms, optionally containing heteroatoms. Examples include 3-isobutyroxy 2,2' dimethyl propanal and 2,2'-dimethyl-3-lauryloxy propanal:

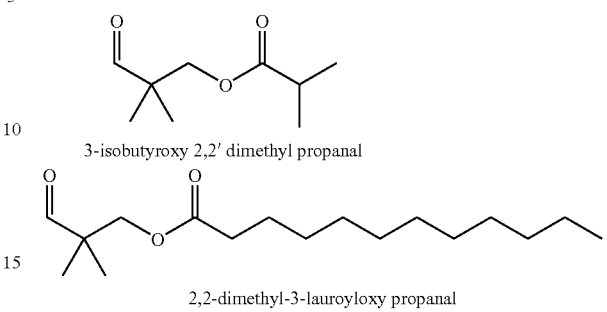

3-isobutyroxy 2,2' dimethyl propanal 2,2-dimethyl-3-lauroyloxy propanal

To the oxazolidine functional prepolymer is added a polyisocyanate. Surprisingly, conventional primary and secondary polyisocyanates can be used without problems with thermal stability, e.g., the trifunctional aliphatic IPDI trimer, trifunctional HDI trimer or low molecular weight MDI prepolymer, e.g., Demsodur VP LS 2397 where residual MDI has been largely removed.

While the adhesives may be used directly as described above, if desired the adhesives of the present invention may also be formulated with conventional additives that are compatible with the composition. Such additives include plasticizers, compatible tackifiers, curing catalysts, dissociation catalysts, fillers, anti-oxidants, pigments, adhesion promoters, stabilizers, aliphatic $C_5$-$C_{10}$ terpene oligomers and the like. Conventional additives that are compatible with a composition according to this invention may simply be determined by combining a potential additive with the composition and determining if they are compatible. An additive is compatible if it is homogenous within the product. Non-limited examples of suitable additives include, without limitation, rosin, rosin derivatives, rosin ester, aliphatic hydrocarbons, aromatic hydrocarbons, aromatically modified aliphatic hydrocarbons, aliphatically modified aromatic hydrocarbons, terpenes, terpene phenol, modified terpene, high molecular weight hindered phenols and multifunctional phenols such as sulfur and phosphorous-containing phenol, terpene oligomers, dimorpholinodiethyl ether, paraffin waxes, microcrystalline waxes and hydrogenated castor oil, organosilane adhesion promoters.

The invention also provides a method for bonding articles together which comprises applying the reactive hot melt adhesive composition of the invention in a liquid melt form to a first article, bringing a second article in contact with the composition applied to the first article, and subjecting the applied composition to conditions which will allow the composition to cool and cure to a composition having an irreversible solid form, said conditions comprising moisture.

The composition is typically distributed and stored in its solid form, and is stored in the absence of moisture. When the composition is ready for use, the solid is heated and melted prior to application. Thus, this invention includes reactive polyurethane hot melt adhesive compositions in both its solid form, as it is typically to be stored and distributed, and its liquid form, after it has been melted, just prior to its application.

After application, to adhere articles together, the reactive hot melt adhesive composition is subjected to conditions that will allow it to solidify and cure to a composition that has an irreversible solid form. Solidification (setting) occurs when the liquid melt is subjected to room temperature. Curing, i.e., chain extending, to a composition that has an irreversible solid form, takes place in the presence of ambient moisture.

As used herein, "irreversible solid form" means a solid form comprising crosslinked reaction products of the oxazolidine prepoylmers and polyfunctional isocyanates. The composition having the irreversible solid form typically can withstand temperatures of up to 150° C.

The invention is further illustrated by the following non-limiting examples.

EXAMPLES

In the Examples that follow, the following methods were used.

Melt Viscosity:

Melt viscosity was measured using a Brookfield Viscometer model RVDV-1+ with a Model 74R temperature controller and Thermosel unit, using spindle no. 27. The adhesive was heated in an oven to 120° C. 14 g of adhesive was weighed into a disposable aluminium viscometer tube. The tube was inserted into the Viscometer and left to equilibrate to a constant viscosity reading at 120° C. for 20 minutes. The viscosity was further measured after 1 and 2 hours. The thermal stability was measured as the average % viscosity increase per hour.

Green Strength:

A 150 micron thick film of adhesive was applied to a glass plate, preheated at 120° C. A strip of PVC (25 mm wide, 7 mil thick) with a hole punched near one end was applied over the adhesive. The plate was inverted and a thermocouple was attached to the glass plate to record the temperature as it falls. At a suitable temperature, a 1 Newton weight was suspended from the hole in the vinyl at the time set at t=0. At 1 minute intervals, the temperature and distance moved was recorded. The peel rate at these intervals was calculated.

Open Time:

The adhesive was preheated to 120° C. and a 150 micron thick film was applied to MDF (Medium Density Fiberboard). The time was set at t=0. At intervals of 30 seconds or 1 minute, a paper strip was applied using a 2.0 Kg roller across the surface of the paper in contact with the adhesive. The open time limit occurs when there is no paper tear resulting from a lack of adequate wetting of the paper by the adhesive.

Cure Rate

Hot adhesive was poured into a small cube consisting of silicone release paper, dimensions 20×20×20 mm. After allowing the adhesive to cool, the adhesive was placed in a constant environment 23° C./50% RH for 6 days. After this time the cube was cut open and the average thickness of the cured cube walls was measured.

Lap Shear Strength on Beech Wood:

Beechwood specimes of dimensions 115×25×3 mm were used. 250 microns of adhesive were applied to an area 25×25 mm the end of 6 beechwood strips, by preheating the adhesive and using a preheated coating block. As quickly as possible, a second beech wood strip was placed on top of each so that the overlap area of the joint was 25×25 mm. The 6 lap shear joints were place on top of each other between metal plates. A pressure of 50 psi was applied for 10 seconds to the 6 lap shear joints and the metal plates were tightened. The adhesive in the joints was allowed to cure at 23° C./50% RH for 1 week.

The shear strengths were measured using a JJ Lloyd tensometer, with a crosshead speed of 125 mm/minute. The shear strength at break was recorded by dividing the force by the area of lap shear overlap (N/mm$^2$=MPa).

Method 1: Beechwood lap shear strength was measured at room temperature/humidity.

Method 2: Beechwood Lap shear strength measured at 80° C. in an air circulated oven.

Method 3: Beechwood lap shear strength was measured at room temperature/humidity after further 1 day immersion in water and 1 day to dry out.

Lap Shear Strength on Polycarbonate:

Moulded polycarbonate pieces of thickness 4 mm were used with one end of dimensions 20×20 mm. Adhesive was applied to one polycarbonate piece and immediately a second piece of polycarbonate was applied on top. The pieces were squeezed together ensuring the gap between substrates was 2 mm and ensuring that adhesive covered the area of overlap of 20×20 mm. The materials were allowed to cure at 23° C./50% RH for 14 days.

The shear strengths were measured using a JJ Lloyd tensometer, with a crosshead speed of 125 mm/minute. The shear strength at break was recorded by dividing the force by the area of lap shear overlap (N/mm$^2$=MPa).

Method 4: Polycarbonate lap shear strength was measured at room temperature/humidity.

Method 5: Polycarbonate lap shear strength was measured at 80° C. in an air circulated oven.

The following materials were used in the examples:

Modaflow (Elementis) is a degassing agent.

Voranol P2000 (Dow Chemical) is a polyether diol—poly(propylene glycol)—with a molecular weight Mn=2000 g per mole.

CAPA 6400: polycaprolactone polyester, crystalline, molecular mass Mn: 37,000 available from Perstorp.

Dynacol 7380 (Evonik Degussa International AG) is a crystalline saturated copolyester diol with a melting point of 70° C. and Mn=3500 g per mole.

Elvacite 2016: acrylic copolymer with Mw=60,000 g per mole and Tg=50° C. available from Lucite International.

Elvacite 2903: hydroxyl functional acrylic polymer with Mw=26,000 and Tg=50° C. available from Lucite International.

Escorene Ultra UL 15019 CC: ethylene vinyl acetate copolymer having a vinyl acetate content of 19% and a melt flow index of 150, available from Exxon Mobil.

Novares TK100 (Rutgers VFT) is an aliphatically modified aromatic hydrocarbon resin with a softening point of 100° C.

Oxazolidine 1: a hydroxyl functional oxazolidine made from diethanolamine and isobutyraldehyde, obtained from Industrial Copolymers Ltd.

Oxazolidine 2: a hydroxyl functional oxazolidine made from diethanolamine and 2-ethyl hexanal obtained from Industrial Copolymers Ltd.

Oxazolidine 3: a hydroxyl functional oxazolidne made from diethanolamine and lily aldehyde obtained from Industrial Copolymers Ltd.

4,4'-MDI: methylene bisphenyl diisocyanate available from Huntsman.

Vestanat T1890/100: isophoronediisocyanate trimer available from Evonik Degussa International AG.

Desmodur VPLS 2397 (Bayer) is an MDI based prepolymer based on poly(propylene glycol) and with a low free MDI monomer content of 0.2%.

Example 1

Adhesive formulation A was prepared as follows: Polyol and acrylic components in the amounts (wt %) shown in Table 1 were blended together at 120° C. and vacuum applied for one hour. MDI was added and allow to react with the hydroxyl groups at 120° C. for one hour (NCO in excess), under vacuum. The remaining NCO was reacted with the hydroxyl functional oxazolidine at 120° C. for one hour under vacuum. The IPDI trimer was added and mixed for 30 minutes at 120° C., and a further 30 minutes under vacuum.

TABLE 1

| Formulation A | |
| --- | --- |
| Voranol P2000 | 46.1 |
| Elvacite 2016 | 16.3 |
| Dynacoll 7380 | 5.4 |
| 4,4'-MDI | 11.1 |
| Oxazolidine 3 | 11.5 |
| Vestanat T1890/100 | 9.6 |

Formulation A was compared to a reference material, PUR-FECT-9021, a commercially available MDI based moisture curing —NCO functional adhesive. Results are shown in Table 2. Formulation A exhibits good overall properties in comparison to the reference material and would be particularly well suited for use as a panel laminating adhesive.

TABLE 2

| | Melt viscosity (mPa · s) | Stability (% per hour) | Open time (minutes) | Green strength (mm/min @ 33 C.) | Lap shear strength (1) (MPa) | Lap shear strength (2) (MPa) | Lap shear strength (3) (MPa) |
| --- | --- | --- | --- | --- | --- | --- | --- |
| A | 7,000 | 6.5 | 21 | 9 | 4.39 | 1.26 | 2.59 |
| PUR-FECT 9021 | 13,000 | 3.0 | 10 | 20 | 5.37 | 1.52 | 2.49 |

(1) Method 1: Beechwood lap shear strength was measured at room temperature/humidity
(2) Method 2: Beechwood lap shear strength measured at 80° C. in an air circulated oven
(3) Method 3: Beechwood lap shear strength was measured at room temperature/humidity after further 1 day immersion in water and 1 day to dry out Example 2

Adhesive formulation B having the components (wt %) shown in Table 3 was prepared as described in Example 1 except that the non reactive EVA was blended with the polyol mixture before reaction with isocyanate.

TABLE 3

| Formulation B | |
| --- | --- |
| Voranol P2000 | 36.43 |
| CAPA 6400 | 6.74 |
| Elvacite 2903 | 18.7 |
| EVA 19-150 | 15.0 |
| MDI | 9.73 |
| Oxazolidine 1 | 5.24 |
| Vestanat T1890/100 | 8.06 |
| Modaflow | 0.1 |

Formulation B was compared to a reference product formulation, PURFECT-9008, a commercially available moisture curable adhesive based on —NCO functional prepolymers. PC lap shear specimens were evaluated after 2 weeks and results are shown in Table 4. Formulation B produced cohesive failure with higher lap shear strength at high temperature and would be particularly well suited for use as an assembly adhesive for plastic components.

TABLE 4

| | Melt viscosity (mPa · s) | Lap shear strength (4) (MPa) | Lap shear strength (5) (MPa) |
| --- | --- | --- | --- |
| B | 33100 | 6.0 (CF) | 1.78 (CF) |
| PURFECT-9008 | 8000 | 6.2 (AF) | 0.97 (AF) |

(4) Method 4: Polycarbonate lap shear strength was measured at room temperature/humidity
(5) Method 5: Polycarbonate lap shear strength was measured at 80° C. in an air circulated oven
CF = cohesive failure;
AF = adhesive failure Example 3

A reference formulation based on MDI was compared to formulations C, D, E and F. These formulations have the components shown in Table 5.

Formulations C, D, E and F were made by reacting the —NCO with different hydroxyl functional oxazolidines. The —NCO/OH ratio for the initial prepolymer was 1.5/1 and then all remaining functional groups were reacted with the hydroxyl functional oxazolidine. IPDI trimer was added as the polyfunctional isocyanate in formulations C, D and E whereas MDI based prepolymer VPLS 2397 was added as the polyfunctional isocyanate in formulation F. The physical properties of these formulations are shown in Table 6.

TABLE 5

| | reference | C | D | E | F |
| --- | --- | --- | --- | --- | --- |
| Voranol P2000 | 59.8 | 53.0 | 52.2 | 51.1 | 47.1 |
| Elvacite 2016 | 21.2 | 18.7 | 18.4 | 18.1 | 16.7 |
| Dynacoll 7380 | 7.0 | 6.2 | 6.1 | 6.0 | 5.5 |
| MDI | 12.0 | 10.6 | 10.5 | 10.2 | 9.5 |
| Oxazolidine 1 | | 4.5 | | | |
| Oxazolidine 2 | | | 6.0 | | 5.4 |
| Oxazolidine 3 | | | | 8.0 | |
| Vestanat T1890/100 | | 6.9 | 6.79 | 6.65 | |
| Desmodur VPLS 2397 | | | | | 15.8 |

TABLE 6

| | Melt viscosity (mPa · s) | Thermal stability (% increase per hour) | Cure rate (mm per day) | Lap shear strength (1) (MPa) |
| --- | --- | --- | --- | --- |
| reference | 5100 | 7.5 | 0.9 | 4.6 |
| C | 12500 | 11.7 | 0.8 | 3.6 |
| D | 9900 | 12.5 | 0.85 | 3.7 |
| E | 9550 | 7.6 | 0.75 | 3.3 |
| F | 13350* | 11.6* | 0.85 | 3.9 |

*measured at 110° C.

Formulations C, D, E and F according to the invention have similar properties to the reference.

The invention claimed is:

1. A solvent free, moisture curable hot melt adhesive composition comprising an oxazolidine functional polyurethane prepolymer and a polyfunctional isocyanate.

2. The adhesive of claim 1 wherein the oxazolidine functional polyurethane prepolymer is prepared by reacting an isocyanate terminated polyurethane prepolymer with a hydroxy functional oxazolidine.

3. The adhesive of claim 2 wherein more than about 75% of the —NCO in the isocyanate terminated polyurethane prepolymer is reacted with the hydroxy functional oxazolidine.

4. The adhesive of claim 3 wherein more than about 90% of the —NCO in the isocyanate terminated polyurethane prepolymer is reacted with the hydroxy functional oxazolidine.

5. The adhesive of claim 4 wherein 100% of the —NCO in the isocyanate terminated polyurethane prepolymer is reacted with the hydroxy functional oxazolidine.

6. The adhesive of claim 2 wherein the isocyanate terminated polyurethane prepolymer is prepared by reacting a mixture of polyols with excess diisocyanate.

7. The adhesive of claim 6 wherein the diisocyanate is MDI.

8. The adhesive of claim 6 wherein the isocyanate terminated polyurethane prepolymer is prepared by reacting a mixture of polyols with excess diisocyanate and wherein an ethylene vinyl acetate copolymer was blended with the polyol mixture before reaction with the diisocyanate.

9. The adhesive of claim 6 wherein the mixture of polyols comprise a polyether polyol, a polyester polyol and an acrylic polyol.

10. The adhesive of claim 2 wherein the hydroxyl functional oxazolidine has the structure

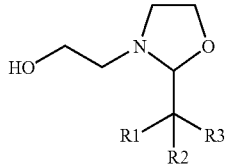

where R1 is H, R2 is methyl or ethyl and R3 is methyl or a linear or branched chain containing 2 to 20 carbon atoms.

11. The adhesive of claim 2 wherein the hydroxyl functional oxazolidine has the structure

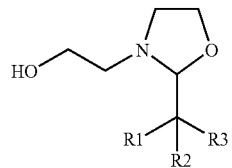

where R1 and R2 is methyl or ethyl and R3 is a linear of branched chain containing 2 to 20 carbon atoms.

12. The adhesive of claim 1 further comprising a thermoplastic polymer or resin.

13. The adhesive of claim 1 wherein the polyfunctional isocyanate is a trifunctional aliphatic IPDI trimer or a trifunctional HDI trimer.

14. A method of preparing a moisture curable polyurethane hot melt adhesive comprising
reacting excess polyisocyanate with polyol to form an isocyanate terminated polyurethane prepolymer,
reacting the —NCO end groups of the isocyanate terminated polyurethane prepolymer with hydroxy functional oxazolidine to form an oxazolidine functional polyurethane prepolymer, and
adding a polyisocyanate to said oxazolidine functional polyurethane prepolymer.

15. A method for bonding materials together which comprises applying the reactive hot melt adhesive composition of claim 1 in a molten form to a first substrate, bringing a second substrate in contact with the composition applied to the first substrate, and subjecting the applied composition to conditions comprising moisture, whereby the composition cools and cures to an irreversible solid form thereby bonding said first substrate to said second substrate.

16. The method of claim 15 wherein at least one of said first or second substrate is a wood substrate.

17. The method of claim 15 wherein at least one of said first or second substrate is a plastic substrate.

18. An article manufactured using the adhesive of claim 1.

19. The method of claim 14 wherein the polyfunctional isocyanate is a trifunctional aliphatic IPDI trimer or a trifunctional HDI trimer.

* * * * *